3,150,060
PURIFICATION OF PLASMINOGEN
Benjamin E. Sanders, Sumneytown Pike, North Wales, and Edward V. C. Smith, Norwood, Pa., assignors to Merck & Co., Inc., Rahway, N.J., a corporation of New Jersey
No Drawing. Filed Sept. 12, 1961, Ser. No. 137,511
2 Claims. (Cl. 195—66)

This invention relates to an improved process for obtaining plasminogen from mammalian blood, and more particularly relates to a novel process for the purification of such plasminogen.

Plasminogen is also known as profibrinolysin and plasma trypsinogen. It is the precursor or the inactive form of plasmin and may be converted to plasmin by combining it with an activator, such as, for example, streptokinase, staphylokinase, chloroform, or the like. The resulting plasmin is an enzyme, also known as fibrinolysin and serum tryptase, which is used medicinally in the treatment of thromboembolic disorders. As such, it serves to dissolve or disassociate blood clots when injected into the blood steam, thereby exhibiting fibrinolytic activity.

Plasminogen is conventionally obtained from mammalian blood by known techniques such as those described by Loomis et at. in Arch. Biochem., 12, 1 (1947); by Christensen in J. Clin. Invest., 28, 163 (1949); and by Kline in J. Biol. Chem., 204, 949 (1953), these dismade a part thereof. A preferred source is Cohn Fraction III-3. Nevertheless, the plasminogen obtained by closures being incorporated herein by reference and means of these and other known isolation techniques is not highly pure, but rather contains certain contaminants which remain during the transformation to plasmin. Among these contaminants are many proteins that are believed to be potentially toxic, since they may contain high molecular weight antibodies such as isoagglutinins; lipoproteins, which are easily denatured, creating antigenic material; and some of the clotting components. Lipoproteins are in fact so readily denatured that there is a tendency for them to be carried through a number of purification procedures. It is believed that these contaminants are difficult to remove from plasminogen because of their tendency to co-precipitate with plasminogen. Although purification procedures involving strongly acid treatments of plasminogen have been utilized, it is felt by some that such treatment is undesirable.

It is therefore an object of this invention to provide for the purification of plasminogen obtained from mammalian blood.

It is another object of this invention to purify such plasminogen by separating from plasminogen containing material, potentially toxic and other proteins naturally associated with the plasminogen.

It is another object of this invention to conduct said separation of plasminogen active material while retaining the fibrinolytic activity thereof.

It is another object of this invention to obviate the co-precipitation of other proteinaceous materials with plasminogen.

It is another object of this invention to provide a purification process for plasminogen which does not involve the use of strongly acid reagents.

It has now been discovered that highly purified plasminogen may be recovered from Cohn alcohol Fraction III-3 without any substantial loss of fibrinolytic activity, in accordance with the process of this invention. First, a portion of Cohn alcohol Fraction III-3 is adjusted in aqueous solution, from its initial pH value to a pH of about 7.5, whereby a precipitate is formed. After separating the precipitate, which may be accomplished by centrifugation, the pH of the supernatant liquid is adjusted to a pH of about 5.3, whereby a second precipitate is formed. The second precipitate is then removed by centrifuging and dissolved in water. The pH of this solution is adjusted to within the range of from about 8.9 to about 9.0 by addition of .01 M lysine and .02 M ammonium acetate, following which step, diethyl aminoethyl cellulose is stirred into the solution and serves to adsorb remaining impurities, while leaving plasminogen in solution. The plasminogen is filtered off from the diethylaminoethyl cellulose, and this step is preferably repeated several times with fresh additions of diethylaminoethyl cellulose for ultimate purity. The thus purified plasminogen may be used directly in this form, or may be fractionally recovered in varying concentrations from a diethylaminoethyl cellulose column which has been previously equilibrated to a pH range of about 8.9–9.0, by chromatographic analysis.

In the following examples, the unit activity of plasminogen containing material is assayed in accordance with the method prescribed by Baumgarten, W., Ciminera, J. L., and Cole, R. B., in Assay Procedures For Quantitative Determination of Clot Lysis Activity, Vox Sang. 5, 416–24 (1960).

EXAMPLE 1

A water slurry containing 0.5 grams of Cohn alcohol Fraction III-3 per each 100 ml. of water was prepared, the initial assay thereof being 44,000 units per ml., 95,600 units per mg. nitrogen, and .461 mg. nitrogen. The pH of the slurry was 8.1. The pH was adjusted downward to 7.5, which caused a precipitation and incidental clarification of the supernatant liquid. The precipitate was centrifuged out, and the supernatant liquid then assayed 38,000 units per ml., 94,575 units per mg. N, and .40 mg. nitrogen. The pH of the supernatant liquid was then adjusted to pH 5.3 whereupon a precipitate was formed. This precipitate was centrifuged out and dissolved in one half of the original water volume, which solution assayed 57,200 units per ml., 143,000 units per mg. nitrogen, and .406 mg. nitrogen. The pH of this solution was then adjusted to within the range of from pH 8.9 to pH 9.0 by additions of .01 M lysine and .02 M ammonium acetate. Diethylaminoethyl cellulose was then added and stirred for about 45 minutes. The solution was then filtered, with the filtrate assaying 24,400 units per ml. and 568,400 units per mg. nitrogen. This pH adjustment was repeated twice more with fresh additions of diethylaminoethyl cellulose followed by filtration. The two additional filtrates assayed 7,540 units per ml., 685,000 units per mg. N, and 3,185 units per ml., 300,000 units per mg. N, respectively. The 24,400 units per ml. filtrate was added to a diethylaminoethyl cellulose column, which was previously equilibrated to pH 8.9 by additions of .01 lysine and .02 M ammonium acetate. Fractional cuts of purified material having the following assays were then obtained by chromatographic analysis:

| Cut No. | Assay |
| --- | --- |
| 1 | 910 units per ml. |
| 2 | 10,790 units per ml., 710,000 units per mg. N. |
| 3 | 19,110 units per ml. |
| 4 | 20,150 units per ml., 816,000 units per mg. N. |
| 5 | 19,435 units per ml. |
| 6 | 13,400 units per ml., 710,000 units per mg. N. |
| 7 | 6,100 units per ml. |
| 8 | 3,400 units per ml. |

EXAMPLE 2

Following the procedures of Example 1, a water slurry of 0.5 gm. Cohn alcohol Fraction III-3 per 100 ml. water (pH 9.2), having an initial assay of 43,745 units per ml., and 90,000 units per mg. nitrogen, was adjusted to pH 7.5, with the formation of a precipitate. After centrifuging and discarding the precipitate, the supernatant liquid assayed 34,255 units per ml., and 100,000 units per mg. N. The pH of this supernatant liquid was then adjusted to pH 5.3, and a precipitate was observed. This precipitate was centrifuged out and dissolved in one half of the original volume of water, which solution assayed 46,000 units per ml., and 150,000 units per mg. N. The supernatant liquid, which was then discarded had only a low order of unit activity. The one half volume solution was then adjusted to pH 8.9 by additions of .01 M lysine and .02 M ammonium acetate. Diethylaminoethyl cellulose was then added, stirred with the solution for about 45 minutes, and filtered out. This step was repeated twice more with fresh additions of diethylaminoethyl cellulose, the three filtrates assaying as follows:

1st filtrate—31,400 units per ml., 760,000 units per mg. N.
2nd filtrate—9,900 units per ml.
3rd filtrate—4,200 units per ml.

The first filtrate was then added to a diethylaminoethyl cellulose column, which was previously equilibrated to pH 8.9 by additions of .01 M lysine and .02 M ammonium acetate. Fractional cuts having the following assays were then obtained by chromatographic analysis:

| Cut No. | Assay |
|---|---|
| 1 | No activity. |
| 2 | No activity. |
| 3 | 3,640 units per ml. |
| 4 | 12,200 units per ml., 760,000 units per mg. N. |
| 5 | 15,145 units per ml., 522,000 units per mg. N. |
| 6 | 24,180 units per ml., 1,000,000 units per mg. N. |
| 7 | 22,360 units per ml., 860,000 units per mg. N. |
| 8 | 16,900 units per ml., 1,200,000 units per mg. N. |
| 9 | 6,700 units per ml., 900,000 units per mg. N. |
| 10 | 1,300 units per ml. |

It will be seen by analyzing the foregoing examples that the process of this invention provides a means for purifying plasminogen occurring in Cohn alcohol Fraction III-3 while retaining its fibrinolytic activity. The step of originally adjusting the pH to 7.5 surprisingly clarifies the plasminogen solution with small loss of activity and essentially complete removal of the lipid materials. The treatment with diethylaminoethyl cellulose followed by filtration eliminates additional undesirable protein, while the plasminogen retains from about 60 percent to about 90 percent activity.

While the preferred embodiment of this invention has been described in some detail, it will be obvious to one skilled in the art that various modifications may be made without departing from the invention as hereinafter claimed.

Having thus described our invention we claim:

1. A method of purifying plasminogen which comprises the steps of
   (1) diluting Cohn alcohol Fraction III-3 with water,
   (2) adjusting the pH of the aqueous solution to about pH 7.5, whereby a first precipitate is formed,
   (3) separating and discarding the first precipitate, and adjusting the pH of the supernatant liquid therefrom to about pH 5.3, whereby a second precipitate is formed,
   (4) separating the second precipitate and discarding the supernatant liquid therefrom,
   (5) rediluting the second precipitate in water and adjusting the pH of this solution to a point in the range of from about pH 8.9 to pH 9.0 by additions of .01M lysine and .02 ammonium acetate,
   (6) adding diethylaminoethyl cellulose to this second precipitate solution with stirring, and
   (7) recovering purified plasminogen from the solution formed by step (6) by filtering out the diethylaminoethyl cellulose.

2. The method in accordance with claim 1 wherein the plasminogen recovered in step (7) is fractionated chromatographically in a diethylaminoethyl cellulose column previously equilibrated to pH 8.9 by .01 lysine and .02 M ammonium acetate.

References Cited in the file of this patent

UNITED STATES PATENTS

| 2,922,745 | Singher et al. | Jan. 26, 1960 |
| 2,923,665 | Hagan et al. | Feb. 2, 1960 |
| 3,066,079 | Hagan et al. | Nov. 27, 1962 |

OTHER REFERENCES

Kline: Journal Biological Chemistry, 204, 949–955 (1953), QP501J6, Photo-copy 167–74H.

JACS, 68, 459–475 (Cohen et al.), 1946, QD1A5.

Ion Exchangers in Organic and Biochemistry, 1957, pages 327–338.

Richard et al.: Vox Sanguinis 4, 126–131 (1959), 195–62.